June 6, 1944.   W. G. WRIGHT   2,350,439
WHEEL AND AXLE CONNECTION
Filed June 18, 1943
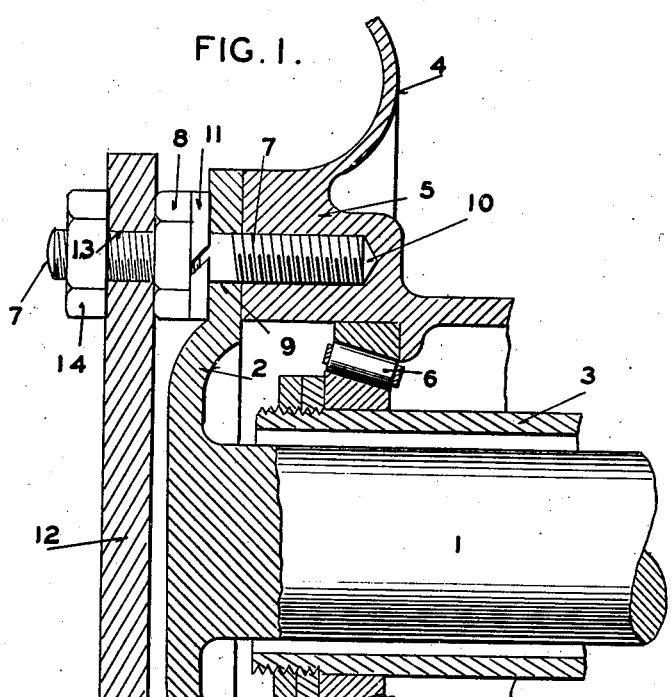
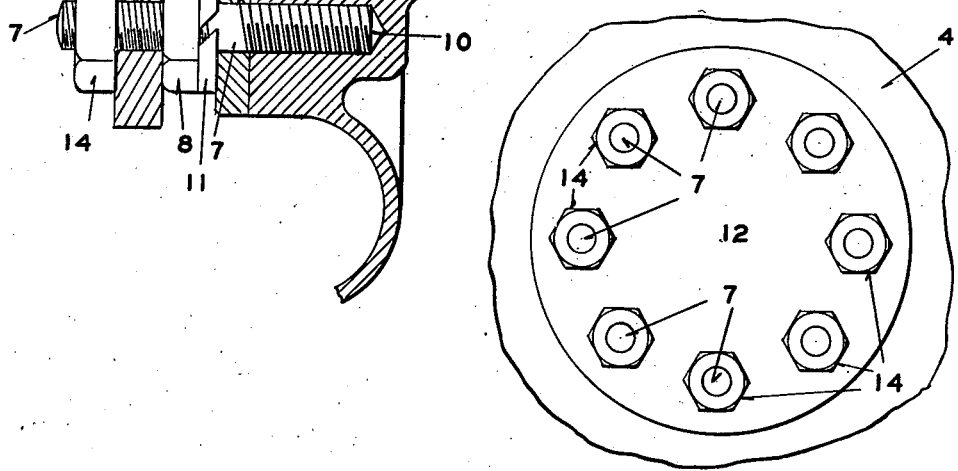
INVENTOR
WM. GUY WRIGHT
BY P. H. Lamphere
ATTORNEY Patented June 6, 1944

2,350,439

UNITED STATES PATENT OFFICE 2,350,439

WHEEL AND AXLE CONNECTION

William Guy Wright, St. Louis, Mo.

Application June 18, 1943, Serial No. 491,307

8 Claims. (Cl. 301—1)

My invention relates to wheels and axles and more particularly to improved means for connecting the two together.

One of the objects of my invention is to provide improved means for so connecting a driving axle to a wheel that increased power can be transmitted to the wheel without breaking of the connecting bolts.

Another object of my invention is to provide auxiliary means for association with the connecting bolts between the axle and the wheel which will decrease the possibility of the bolt breaking when a high torque is present.

Other objects of my invention will become apparent from the following description taken in connection with the accompanying drawing in which Figure 1 is a sectional view of a wheel and axle connection having my invention embodied therein; and Figure 2 is an end view showing the plate as mounted on the outer ends of the bolts.

Referring to the drawing in detail, numeral 1 indicates a rear axle which is provided with a flange 2 at its outer end. The axle extends through a housing 3 and rotatably mounted on the outer end of this housing is a wheel 4 having a hub 5, there being a bearing 6 between the hub and the housing. The wheel is connected to the axle flange in order to be driven by the axle, the connection comprising stud bolts 7 and nuts 8. The stud bolts extend through circumferentially spaced holes 9 in the flange and have their inner ends screwed into threaded bores 10, said bores being spaced so that they and holes 9 align. Lock washers 11 are provided between nuts 8, which cooperate with the outer ends of the bolts, and flange 2.

The connection between the axle and the wheel just described is well known. When nuts 8 are screwed on the stud bolts, the hub of the wheel and the flange of the axle will be clamped together and result in a firm connection. The connection has been found to be satisfactory under ordinary conditions where the vehicle is not overloaded or where the vehicle does not encounter bad ground conditions. When these out of the ordinary conditions are present, it is necessary to transmit great turning forces to the wheel in order to move the vehicle and, as a result thereof, the bolts become broken adjacent the outer ends of bores 10. Repairs are then necessary and if new bolts are not quickly available or if oversize bolts are required, there is a considerable loss in time of vehicle operation.

I have discovered that this breakage of the bolts can be substantially entirely eliminated by the use of longer stud bolts and connecting the outer ends of the stud bolts together beyond the nuts by a rigid member in the form of a plate. When this addition is made to the present connection, breakage occurs very rarely and consequently there will be a great saving in repair to an operator's vehicle in addition to the elimination of losses in time in the operation of the vehicle. This readily amounts to considerable sums where a large fleet of vehicles, such as tractors and trucks, are being operated.

As shown, the rigid member or plate 12 is in the form of a solid disc and is provided with holes 13 so spaced as to receive the outer ends of the stud bolts which extend beyond the clamping nuts 8. Nuts 14 are screwed on the extreme outer ends of the stud bolts and clamp plate 12 between said nuts 14 and the nuts 8. Thus by this arrangement each bolt will be securely connected to the plate and the plate will provide a rigid connection between the outer end of any bolt and the outer end of each of the other bolts. Consequently it will be impossible for the outer ends of any of the bolts to move relatively to any of the other bolts as would be possible when no connecting plate is present. Furthermore, with the plate associated with the bolts, as shown, it will not be possible for one bolt to take a greater load than another as any unequal load coming on one bolt will be distributed to the other bolts by the plate.

The application of the plate to existing connections is a very simple matter. All that need be done is to replace the shorter stud bolts already employed by longer stud bolts in order to provide sufficient threads for securing the plate to the bolts. The nuts 8 and lock washers 11 can be re-used as the new longer bolts will have the same threads as the ones replaced.

The improved construction has been found to be very satisfactory even where the new stud bolts may have a loose fit in the threaded bores 10 of the hub or where holes 9 in the flange of the axle have become slightly oversize. The use of the plate eliminates the necessity of employing oversize bolts to obtain a good connection and the accompanying expense of re-threading the bores to receive an oversive bolt.

The plate need only be about three-sixteenths of an inch in thickness. If there are any obstructions on the end of the axle which would prevent using a solid plate, an annular plate can be used or one having a suitable hole cut in its central portion.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a wheel and axle connection, an axle carrying a wheel attaching part, a wheel provided with a hub part, means comprising nuts and bolts for clamping the axle and hub parts together, and means for rigidly connecting the bolts together at points beyond the nuts employed in clamping the axle and hub parts together.

2. In a wheel and axle connection, an axle carrying a wheel attaching part, a wheel provided with a hub part, means comprising bolts for clamping the axle and hub parts together, and means comprising a member rigidly connecting the bolts together at points axially spaced from both the axle and hub parts, said member forming no part of the means for obtaining the clamping action between the axle and hub parts.

3. In a wheel and axle connection, an axle provided with a wheel attaching flange, a wheel provided with a hub part and means for connecting the hub part to the flange and comprising stud bolts extending through the flange and having their inner ends threaded into the hub part, nuts on the outer ends of the bolts for clamping the flange and hub parts together, and means rigidly connecting together the outer ends of the bolts at points beyond the nuts.

4. In a wheel and axle connection, an axle provided with a wheel attaching flange, a wheel provided with a hub part, means for connecting the hub part to the flange and comprising stud bolts extending through the flange with their inner ends threaded into the hub part and nuts on the other end portions of the bolts for clamping the flange and hub parts together, and means rigidly connecting the outer ends of the bolts together at points beyond the nuts and comprising a rigid member positioned on the bolts and clamped against the nuts.

5. In a wheel and axle connection, an axle provided with a wheel attaching flange having bolt receiving holes, a wheel provided with a hub part having threaded bolt receiving holes, a plurality of stud bolts, each extending through a hole in the flange and having one end screwed into a threaded hole in the hub, a nut cooperating with the threads on the other end of each bolt and clamping the flange and the hub together, said bolts being of such length that the threaded ends receiving the nuts will extend beyond the nuts when in operative position, a plate having holes receiving the threaded ends of the bolts which extend beyond the nuts, and other nuts cooperating with the threaded ends of the bolts received in the holes of the plate for clamping the plate against the first named nuts.

6. In a wheel and axle connection having an axle flange and wheel hub clamped together by stud bolts passing through holes in the flange and screwed into the wheel hub and by cooperating clamping nuts on the outer ends of the bolts, means comprising a rigid member secured to the ends of the bolts beyond the nuts and rigidly connecting these ends of the bolts together.

7. In a wheel and axle connection having an axle flange and wheel hub clamped together by stud bolts passing through holes in the flange and screwed into the wheel hub and by cooperating clamping nuts on the outer ends of the bolts, a plate provided with holes for receiving the ends of the bolts beyond the nuts and other nuts on the ends of the bolts cooperating with the plate for clamping it between said other nuts and the first named clamping nuts.

8. A plate for use with an axle and wheel connection having an axle part and a wheel part clamped together by bolts and nuts, said plate being rigid and having holes so spaced apart as to receive the outer ends of the bolts and be secured to the bolts by additional nuts on the ends of the bolts outside the plate.

WM. GUY WRIGHT.